April 14, 1970  A. H. BELLOWS  3,505,943
PHOTOGRAPHIC APPARATUS
Filed July 19, 1967

INVENTOR.
Alfred H. Bellows
BY
Brown and Mikulka
ATTORNEYS

United States Patent Office 3,505,943
Patented Apr. 14, 1970

3,505,943
PHOTOGRAPHIC APPARATUS
Alfred H. Bellows, Cambridge, Mass., assignor to Polaroid Corporation, Cambridge, Mass., a corporation of Delaware
Filed July 19, 1967, Ser. No. 654,633
Int. Cl. G03d 3/00; G03b 17/50
U.S. Cl. 95—89                                             21 Claims

ABSTRACT OF THE DISCLOSURE

The subject apparatus relates to electrically motor-driven pressure-roll mechanism for compressing a photographically exposed film material carrying a processing liquid to release and spread the liquid between internal layers thereof. A finished print may thus be produced immediately following the exposure by a diffusion transfer process. More particularly, the motor-driven pressure-roll mechanism is intended for incorporation with a photographic exposure and processing chamber such as the back of a hand-held, self-developing camera using a film pack, wherein space is at a premium and compactness is a prime objective. In such a camera and in the interest of space conservation, the hollow interior of one of a pair of pressure rolls thereof may be utilized to advantage for mounting components of the electric drive-motor, provided that the diameter of the roll, thus utilized, is not appreciably increased. The present structure makes possible this objective. It enables housing principal components of a small D.C. electric drive-motor within one cylindrical pressure roll while holding the roll diameter to a minimum. This is achieved by locating drive-shaft, armature, commutator and speed-reduction components therewithin, while positioning two field magnets externally of the pressure roll instead of inside with the other components. Because the magnets are disposed at each side of the pressure roll transversely of the front-to-rear dimension of the camera, the desired thinness thereof is facilitated. The second pressure roll of the pair is not powered but is biased toward the driven roll. Other associated components of the apparatus relate to the advancement and control of units of the film pack between and beyond the pressure rolls.

Objects of the invention are to provide electric-motor drive means for incorporation with one cylindrical pressure roll of a pair of cooperating pressure rolls, the motor being of a type adapted to permit a relatively small diameter of the roll; to provide electric-motor drive means of the aforesaid category wherein motor components exclusive of field-magnet means thereof are positioned within the pressure roll itself, the field-magnet means being positioned externally of the pressure roll; to provide a chamber mounting therewithin a pair of pressure rolls, one of which is electrically motor-driven, the chamber being extremely narrow in a direction which includes the axes of both rolls and being utilized for the exposure and processing of a film unit of a type carrying a releasable processing liquid; to provide a D.C. electric-motor drive means, as described, wherein the components positioned within the cylindrical pressure roll comprise the motor shaft, armature, commutator, speed reduction means, and a plurality of bearings enabling differential rotation of the armature and roll; to provide electric-motor drive means, as stated, wherein the pressure roll is composed of a non-ferromagnetic metal; to provide electric-motor drive means of the character described incorporated in a self-developing type of camera wherein the field-magnet means comprises pole pieces positioned at diametrically opposite external surfaces of the driven pressure roll in a direction transverse of a plane which includes the axes of both pressure rolls; to provide processing means for incorporation with the back of a self-developing camera comprising, respectively, a pair of pressure rolls, one of which is cylindrical and embodies electric-motor drive means therewithin, a means for initially feeding a film unit between the pressure rolls, and switching means interlocking with both the feeding means and pressure rolls for controlling the starting and stopping of rotation of the cylindrical motor-driven roll; and to provide electric-motor drive means of the category described which contributes to the space saving compact characteristics of a camera back with which it is incorporated.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
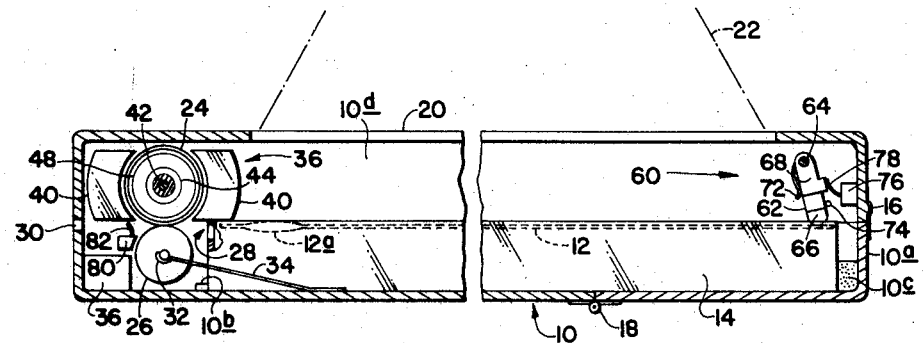
FIGURE 1 is a plan view, in cross-section, of a photographic exposure and processing chamber such as a camera back incorporating the pressure-roll electric-motor drive of the invention.

Referring to the drawing, a chamber 10, such as the back of a camera, for positioning a composite film unit 12 for photographic exposure and, thereafter, effecting its processing is shown in FIGURE 1. The film unit is of a type which includes a processing liquid releasably carried in a container or pod 12a located within its layered structure. The liquid is released and spread throughout the exposed emulsion by subjecting the unit to progressive compression, commencing at the container end. The film unit 12 is to be understood as the foremost of a plurality of such units, not shown, constituting a film pack or carried by a magazine and biased forwardly toward a focal plane, the number 14 representing either form. The film pack 14 may be inserted in the chamber 10 by releasing a latch 16 and pivoting the housing or chamber section 10a open at the hinge 18. The film pack is held in correct position by any suitable means such as the positioning flange 10b and resilient means 10c. When thus positioned, the foremost film unit is located at the focal plane. Exposure of the film unit is performed through the frontal aperture 20 by suitable exposure means, including, for example, an objective and appropriate shutter and diaphragm means, to be understood as positioned forwardly of aperture 20 and not shown. A bellows or other fixed or positionable enclosing conductive means for transmitting the image-forming light rays from the objective toward the focal plane is merely indicated by the broken lines 22, the actual structure forming no part of the present invention.

A pair of pressure rolls 24 and 26 is located at an end of the chamber intermediate of an exit slot of the film pack at 28 and an exit aperture 30 of the chamber. The axes of the rolls will be noted as lying in a plane which is disposed from front-to-rear of the chamber, that is, in a plane which is substantially parallel to an optical axis extending through aperture 20 to the focal plane at which film 12 is positioned. After a photographic exposure, the film unit is adapted to be advanced through slot 28, between the pressure rolls, and through aperture 30 to a location outside of the chamber. Pressure roll 26 is preferably composed of a metal, e.g. a stainless steel, optionally of solid or tubular structure, mounted for rotation in suitable bearings of the chamber, not shown, as by stub-shaft means 32. This roll is non-powered but is biased toward roll 24 by any suitable means such as the flat springs 34, it being understood that mounting of the shaft 32 is such as to permit translational movement of the roll toward and away from roll 24. Accordingly, rotation of roll 26 occurs through its frictional contact with roll 24 or with the advancing film unit. Although not shown, it would be possible, in a modification, to provide a geared connection between rolls 24 and 26.

Pressure roll 24 is of a cylindrical or tubular structure powered by a D.C. electric drive-motor 36, partially positioned within the roll itself, and deriving voltage from a small battery at 38. The motor is shown in greater detail in FIG. 2. The motor structure is of a type which contributes to compactness of the camera 10 in several rerespects. In the first place, by providing roll 24 in tubular form, needed space is made available for mounting a major number of components of the motor therewithin. Secondly, by forming the roll of a non-ferromagnetic metal such as a stainless steel, and positioning the relatively bulky permanent field magnets or pole pieces 40 externally of the roll, it becomes unnecessary to increase the roll diameter to accommodate the magnets therewithin. Thirdly, by placing the magnets exteriorly of the roll, they are positioned longitudinally of the chamber and thus contribute to the desired thinness thereof.

Figure 2:
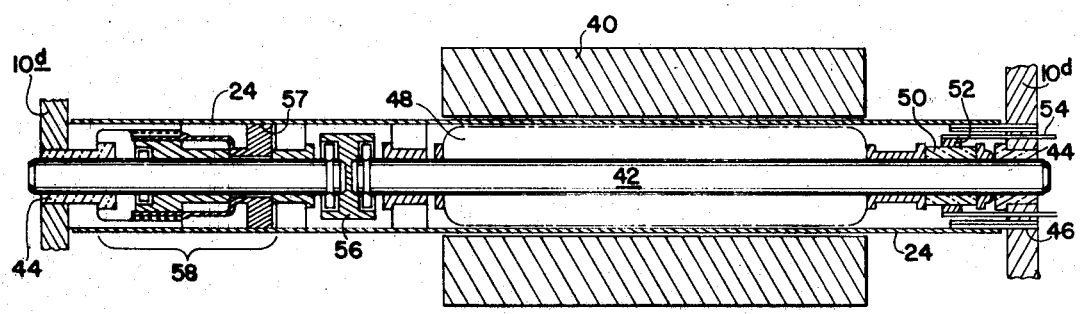
FIG. 2 is a front view in cross-section of a cylindrical pressure roll incorporating an electric-motor drive therefor having external field magnet means.

Referring to FIG. 2, the pressure roll 24 and associated drive-motor 36 are illustrated in detail and comprise components as follows. The motor shaft 42 is mounted for rotation in bushings 44, the latter being inset in the chamber walls 10d. The pressure roll 24, composed of a stainless steel tubing, rotates at one end on circular bearing means, e.g., bronze bushings, at 46 and is connected to a component of reduction transmission means adjacent to its other extremity at 57. Attached to the shaft 42 are an armature 48 and a commutator 50, electrical connection with the latter being provided by brushes 52 and leads 54. A flexible coupling of the motor shaft is provided at 56. The stationary field magnets or N and S pole pieces 40, located externally of the pressure roll 24, are in the form of two magnetically-connected permanent magnets. The concave surfaces of the magnets are so formed as to enable their being positioned in close proximity to the pressure roll surface. In thus locating the magnets, it will be noted that the usual air gap between armature and pole pieces has in part been replaced by a non-ferromagnetic metal, namely, by the stainless steel of the cylindrical pressure roll.

The reduction transmission between the motor shaft 42 and pressure roll 24, indicated at 58, may be of any type adapted to provide a rotation of the latter suitable for processing the film unit, that is, for advancing the film unit between the pressure rolls at a speed suitable to obtain a correct release and spreading of the processing liquid. Assuming, by way of example, an outside diameter of the pressure roll of .4 inch, a rotational speed of the motor shaft of 16,000 r.p.m. and a reduction of 40 to 1, the pressure roll, rotating at approximately 400 r.p.m., would produce advancement of the film unit at a rate of approximately 9 inches per second. A specific form of reduction transmission 58 is not shown, several types shown to the art, e.g., planetary gear, "wabble" gear, or other form of speed-reduction means being suitable for the purpose.

Each film unit 12 is initially manually fed into the V of the pressure rolls, at which point the rotating rolls provide further advancement through the medium of the power drive for roll 24. Means for thus initially manually advancing the film unit from the film pack or magazine 14 is combined in the composite element 60 with switching means for starting the electric drive-motor 36. This element, shown in detail in FIG. 3, includes a film-actuating finger 62, mounted for freedom of rotation on a shaft 64 and having a contact tip 66 adapted to frictionally engage a surface of the film unit 12, an angular lever 68 fixed to the shaft 64, an actuating knob 70 also fixed to shaft 64 and located exteriorly of the chamber housing, a torsion-spring 72 for biasing finger 62 counterclockwise against the cross-piece 68a of the lever and a stop-pin 74 for limiting the counterclockwise movement of lever 68, responsive to that of the finger 62, biased thereagainst.

Figure 4:
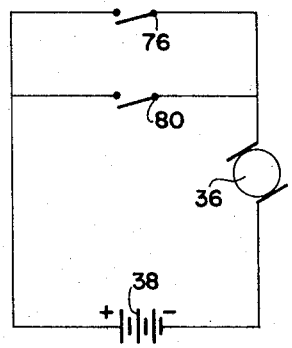
FIG. 4 is a schematic wiring diagram of the electric-motor circuit.

The associated microswitch 76 has a contact-actuating element 78 which is biased to bear against the lever portion 68a when the latter is in contact with the stop pin 74. At this position of element 78 the microswitch contacts are open. When knob 70 is turned in a clockwise direction, lever 68 rotates therewith, causing finger 62 to rotate similarly, against the bias of torsion-spring 72, the finger tip 66 bearing against film unit 12 to advance the latter to the left as illustrated, toward the V of the pressure rolls. Simultaneously with a predetermined degree of movement of lever 68, the microswitch actuating element 78 closes the contacts thereof so as to energize the drive-motor 36 and the pressure rolls commence to rotate, advancing and compressing the film unit once it has entered the bite of the rolls. A second microswitch 80 having a contact-actuating element 82 is positioned immediately adjacent to the egress side of the pressure rolls. The contacts of this microswitch also close and open the circuit, shown in FIG. 4, energizing the drive-motor 36, in an overriding capacity with respect to the switch 76. The contacts of microswitch 80 are normally open but are closed immediately upon contact of the leading edge of the film unit with the actuating element 82 thereof.

Figure 3:
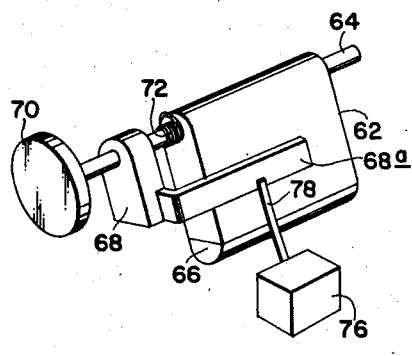
FIG. 3 is a diagrammatic perspective view of combined means for manually feeding a film unit between a pair of pressure rolls, one of which is motor driven, and switching means for energizing the motor.

As soon as the film unit has entered the rotating pressure rolls, finger 62 is returned to its initial position, namely, that shown in FIGS. 1 and 3, under the bias of torsion spring 72, or by turning knob 70 in a counterclockwise direction. Means (not shown) for automatically providing the return of finger 62 and/or lever 68 when knob 70 has been rotated in a clockwise direction by a given amount may, alternatively, be provided. Upon the return of finger 62 and lever 68 to the position shown, the contracts of microswitch 76 are thereby opened, those of microswitch 80 maintaining the closed circuit condition while the film unit passes through the exit aperture 30 until its trailing edge has passed the contact-actuating element 82. The actual location of microswitch 80 is subject to some modification, it being possible, for example, to position it at the entrance side of the pressure rolls.

It is to be understood that the chamber 10 is preferably of elongated but extremely thin dimensions, the thickness being exaggerated in FIGURE 1 to clearly show the components. These dimensions are indicated by the previously-given outside diameter of pressure roll 24 of .4 inch and an illustrated non-powered pressure roll of even smaller diameter. Modification of the field magnet structure is possible within the scope of the invention. Thus, for example, the principal magnet body could be positioned at one side, only, of the motor-driven pressure roll with relatively thin and appropriately curved arms of a similar magnetic material extending from N and S poles of the magnet body so as to be positioned at opposite sides of the pressure roll and constitute the functional pole pieces.

The structures described herein are in no sense to be considered as identified with the processing of but a single form of film unit. One type of contemplated film unit comprises a transparent image-receiving element in combination with an opaque negative. Another film structure employs an opaque processing liquid. An example of a film unit of a category suitable for use in conjunction with the apparatus of the present invention is described in the copending U.S. patent application Ser. No. 622,283, filed Mar. 10, 1967 for Photographic Products and Processes. When the film unit passes through the exit aperture 30, protection of its photosensitive emulsion with respect to ambient light may be necessary because the diffusion transfer process may not yet have been completed. Various expedients for the purpose are known in the art. One such expedient envisions the use of a processing liquid which, in conjunction with the diffusion transfer process, desensitizes the emulsion against further reaction to incident light. Another contemplates the employment of some form of supplementary covering or barrier means relative to protection of the film unit at this stage.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Compact motor-driven pressure-roll apparatus for progressively compressing and thereby processing a photographic film material in conjunction with second compressive surface means, said apparatus comprising a cylindrical pressure roll composed of a non-ferromagnetic material, means mounting said pressure roll for rotation, an electric motor for driving said pressure roll comprising a plurality of components including fixed and rotatable components exclusive of field-magnet means mounted internally of said pressure roll in spaced and contiguous relation to the inner surface thereof, a rotatable armature component being narrowly spaced from said inner surface, field-magnet means mounted externally of and in close proximity to the outer surface of said pressure roll so as to be positioned outwardly in alignment with at least a portion of the area occupied by said armature, and driving means interconnecting a drive component of said internally-mounted components with a complementary drive component identified with the inner surface of said pressure roll for obtaining a given rotation of said pressure roll.

2. Motor-driven pressure-roll apparatus, as defined in claim 1, wherein said armature and said field-magnet means, taken in a direction longitudinally of said pressure roll, are of substantially similar dimensions.

3. Motor-driven pressure-roll apparatus, as defined in claim 1, wherein said field-magnet means comprises a pair of N and S pole pieces located substantially at diametrically opposite external sides of said pressure roll.

4. Motor-driven pressure-roll apparatus, as defined in claim 1, wherein said pressure roll is composed of a non-ferromagnetic metal.

5. Motor-driven pressure-roll apparatus, as defined in claim 4, wherein said metal is a stainless steel.

6. Motor-driven pressure-roll apparatus, as defined in claim 1, wherein said electric motor is a small D.C., battery-energized motor including, in addition to said armature and field-magnet means, a central shaft including a flexible coupling, a commutator, and brush means for contacting the commutator sectors.

7. Motor-driven pressure-roll apparatus, as defined in claim 1, wherein said electric motor includes a main shaft rotatable at a given speed and wherein said driving means is adapted to provide rotation of said pressure roll at a reduced speed.

8. Motor-driven pressure-roll apparatus, as defined in claim 1, wherein said second compressive surface is embodied in a non-motor-driven pressure roll which is biased toward said motor-driven pressure roll.

9. Motor-driven pressure-roll apparatus, as defined in claim 8, wherein said field-magnet means is disposed in a direction generally normal to a plane which includes the axes of both said motor-driven and said non-motor-driven pressure rolls.

10. Compact apparatus for processing an exposed photographic film unit which is adapted to processing through progressive compression thereof, comprising a chamber having access and exit means, a pair of pressure rolls positioned at one end of said chamber adjacent to said exit means, one of said rolls being powered for rotation, the other of said rolls being non-powered and biased toward said powered roll for deriving rotation therefrom, said powered roll being formed of a cylindrical non-ferromagnetic material and containing therewithin a plurality of components of an electric motor including drive means for rotating said roll but exclusive of a field magnet component of said motor, said field magnet component being mounted externally of said powered roll in close proximity to the outer surface thereof, and manually-operable means for introducing said film unit into the bite of said pressure rolls whereat said powered roll is adapted to advance said film unit to provide said progressive compression thereof.

11. Apparatus, as defined in claim 10, wherein said chamber constitutes the back of a self-developing camera.

12. Apparatus, as defined in claim 10, wherein the axes of said pressure rolls are in a plane disposed transversely of said chamber, wherein said field-magnet component is mounted at sides of said powered roll so as to extend in a direction normal to said plane and, accordingly, in a direction longitudinally of said chamber, thereby to contribute to a narrowness of said chamber in a transverse or front-to-rear direction.

13. Apparatus, as defined in claim 12, wherein said electric motor is a D.C. motor powered by a battery, the latter being mounted within said chamber.

14. Apparatus, as defined in claim 13, wherein said film unit is a foremost unit of a film pack, wherein said chamber is adapted to receive and mount said film pack for positioning the photosensitive emulsion of said foremost unit for exposure at a focal plane, and wherein each said unit of the film pack when positioned foremost, as by processing of a preceding unit, is adapted to be manually inserted into the V of said pair of pressure rolls.

15. Apparatus, as defined in claim 14, wherein a manually-operable pivotal engaging element, biased toward a non-functional position by a torsion spring, is mounted adjacent to an end of said chamber opposite that occupied by said pair of pressure rolls, said engaging element being adapted to engage said foremost film unit and advance it into the V of said pressure rolls.

16. Apparatus, as defined in claim 15, wherein said engaging element is operable by lever-like means adapted to bear thereagainst and to close the contacts of a switch provided in an electrical circuit comprising said battery and said electric motor for energizing said motor, whereby said pressure rolls are caused to commence rotation substantially immediately prior to the entrance of said film unit into said V thereof.

17. Apparatus, as defined in claim 16, wherein a second switch is provided in said circuit located immediately adjacent to one side of said pressure rolls and adapted to be contacted and closed through contact therewith of the leading edge of said film unit, thereby maintaining said circuit and motor energized after said first-named switch has been returned to an open condition.

18. In a self-developing camera back, a cylindrical pressure roll composed of a non-ferromagnetic material and driven by a small D.C. electric motor for progressively compressing, in conjunction with a non-motor-driven pressure roll, a photographically exposed film unit to provide therewithin the release and spreading of a processing liquid and the formation of a finished photographic print, said electric motor comprising a plurality of components including a rotatable armature and reduction transmission means mounted internally of said cylindrical pressure roll, and field-magnet means mounted externally of and in close proximity to the outer peripery of said cylindrical pressure roll, said field-magnet means thereby being disposed in a direction longitudinally of said camera back.

19. A compact rotatable motor-driven cylindrical roll comprising a tubular wall composed of a non-magnetic material, means mounting said roll for rotation about its longitudinal axis, an electric motor for providing rotation of said roll including stationary magnetic-field means mounted externally of said tubular wall of said roll in spaced relation but in close proximity to the outer surface thereof, a current-conducting element adapted to rotate responsive to said magnetic-field means mounted for rotation within said roll and narrowly spaced from the inner surface of said tubular wall thereof, and driving means interconnecting said current-conducting element and the inner surface of said roll for providing a given rotation of the latter, the magnetic-field means being at least partially aligned with the current-conducting element in a transverse direction taken inwardly of said roll for exercising a functional magnetic field.

20. A compact motor-driven cylindrical roll comprising a tubular wall composed of a non-magnetic material, means mounting said roll for rotation about its longitudinal axis, an electric motor for driving said roll including a plurality of fixed and rotatable components, exclusive of field-magnet means mounted internally of said roll, a rotatable armature component being narrowly spaced from the inner surface of said tubular wall, field-magnet means mounted externally of said tubular wall and narrowly spaced from the outer surface thereof so as to be positioned outwardly in alignment with at least a portion of the internal area occupied by said armature, and driving means interconnecting a drive component associated with said armature and a complementary driven component associated with the inner surface of said tubular wall.

21. For use in a hand-held camera, compact motor-driven pressure-roll apparatus for progressively compressing and thereby processing a photographic film material in conjunction with second compressive surface means, said apparatus comprising a cylindrical pressure roll, means mounting said pressure roll for rotation, an electric motor for driving said pressure roll having its rotatable component mounted internally of said pressure roll and its magnetic-field means fixedly mounted externally of said pressure roll, and driving means interconnecting said rotatable component with said pressure roll for obtaining a given rotation of said pressure roll.

References Cited

UNITED STATES PATENTS

| | | | |
|---|---|---|---|
| 2,246,777 | 6/1941 | Bordeaux et al. | 310—86 |
| 2,673,301 | 3/1954 | Richter | 310—86 |
| 2,969,722 | 1/1961 | Schwartz | 95—31 |
| 3,126,803 | 3/1964 | Hintze | 95—31 |
| 3,426,664 | 2/1969 | Norton | 95—13 |

NORTON ANSHER, Primary Examiner

A. MATHEWS, Assistant Examiner

U.S. Cl. X.R.

95—13